No. 667,780. Patented Feb. 12, 1901.
M. W. JELINEK.
SAFETY CAGE CHAIR.
(Application filed May 26, 1900.)
(No Model.)

Witnesses,
H. M. Neff
Grace Mytinger

Inventor,
Matthias W. Jelinek
By
Attorney

UNITED STATES PATENT OFFICE.

MATTHIAS W. JELINEK, OF BLACK HAWK, COLORADO, ASSIGNOR OF ONE-THIRD TO WILLIAM H. DAVIS, OF SAME PLACE.

SAFETY CAGE-CHAIR.

SPECIFICATION forming part of Letters Patent No. 667,780, dated February 12, 1901.

Application filed May 26, 1900. Serial No. 18,156. (No model.)

*To all whom it may concern:*

Be it known that I, MATTHIAS W. JELINEK, a citizen of the United States of America, residing at Black Hawk, in the county of Gilpin and State of Colorado, have invented certain new and useful Improvements in Safety Cage-Chairs; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in safety cage-chairs for mining-shafts of the class having chairs or supporting-dogs mounted on the cage and arranged to be manipulated by the cager or person in charge of the cage whenever it is necessary or desirable to stop.

The invention will now be described in detail, reference being made to the accompanying drawings, in which is illustrated an embodiment thereof.

Figure 1:
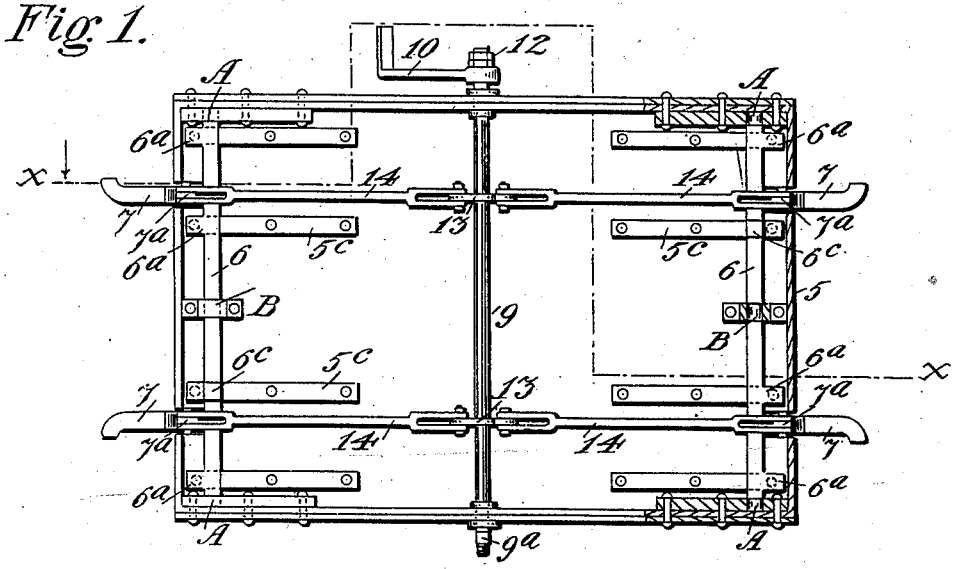
Figure 2:
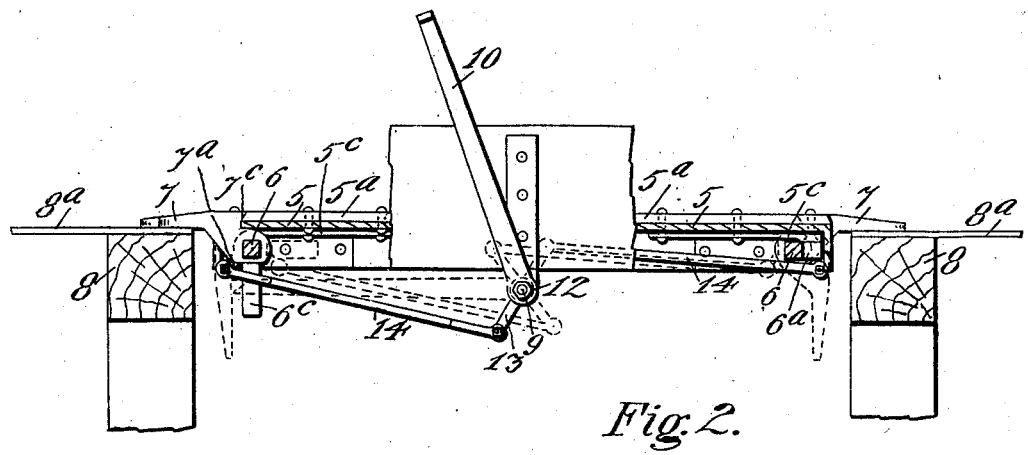

In the drawings, Figure 1 is an underneath view of a cage equipped with my improvements. Fig. 2 is a section taken through the cage on the line X X, Fig. 1, viewed in the direction of the arrow and showing the shaft-timbers.

The same reference characters indicate the same parts in the views.

Let the numeral 5 designate the cage, to the bottom of which are journaled two bars or axles 6, one near each end of the cage. The axles, as shown in the drawings, are square in cross-section, except at the bearings, of which each axle has three, two end bearings A A and an intermediate bearing B. Upon each of these axles are mounted and made fast two dogs 7, which form the chairs of the cage. The length of these dogs is so regulated that when projected outwardly to a horizontal position they engage the shaft-timbers 8 at the various stations or levels which lie in their path, causing the cage to stop. (See Fig. 1 and full lines in Fig. 2.) When, however, these dogs are thrown to the dotted-line position, (see Fig. 2,) they hang down below the cage, which is then allowed to move freely in the shaft. The mechanism for operating these dogs will now be described.

Upon the central portion of the bottom of the cage is journaled a shaft 9, whose extremities protrude on opposite sides sufficiently for the attachment of a crank 10 at either end of the shaft. The shaft extremities are square, as shown at $9^a$, to receive the crank, which is held in place in any suitable manner, as by nuts 12. To this shaft are made fast two short bars 13, each of which projects from the shaft in opposite directions, forming two cranks of equal length. Each of the cranks is connected with one extremity of a link 14, whose opposite extremity is connected with a projection $7^a$, formed on a dog 7. Hence it is evident that by giving the shaft 9 a partial turn in the one direction or the other, as desired, the axles 6 will be actuated sufficiently to throw the dogs to either the full-line position or dotted-line position in Fig. 2. The turning of the shaft 9 may be accomplished through the medium of the crank 10, which may be turned by the cager or by the engineer through the instrumentality of a simple device (not shown) located at each level or station, the said operating device being covered by a simultaneously-pending application.

The dogs 7 are held in the horizontal position by virtue of lugs $6^a$, formed on the axle 6 and adapted to engage the bottom of the cage and prevent the axles from turning farther after the dogs 7 have reached the horizontal position. Each dog is further locked against movement when in the horizontal position by a shoulder $7^c$, which engages or abuts against the extremity of a rail $5^a$ on the bottom of the cage. When the dogs 7 are thrown to the vertical position, or the dotted-line position in Fig. 1, they are prevented from further inward movement by stops $6^c$, formed on the axles 6 and extending at right angles to the lugs $6^a$, whereby the dogs 7 are held in the vertical position, the said stops bearing against metal strips $5^c$, secured to the bottom of the cage.

It will be understood that it will be impossible for the cager to withdraw the dogs from the horizontal position until the cage has been raised from the wall-plates $8^a$ of the timbers 8 sufficiently to allow the dogs to swing to the dotted-line position. Hence when the dogs are thrown to the idle position the engineer must have complete control of the engine, thus preventing the withdrawal of the dogs or chairs without his knowledge, which might result in accident by precipitating the cage to the bottom of the shaft. In case of accident to the brake or cable of the hoisting-engine, whereby the engineer loses control of the cage, the latter may be stopped by the cager by throwing the chair-dogs to the horizontal position as heretofore explained.

When the chair-dogs 7 are in the position shown in full lines in the drawings, they act as the rails on which the ore-car (not shown) is run from the drift or tunnel onto the cage. Hence the dogs are in line with the track-rails $5^a$ on the floor of the cage, and their extremities are turned outwardly to guide the car to its position on the rails of the cage.

Having thus described my invention, what I claim is—

1. In a safety-cage-chair construction, the combination with a cage, of dogs pivotally mounted thereon and arranged to be thrown to a position to form chairs adapted to engage the wall-plates at the various levels, the floor of the cage being provided with rails with which the dogs are in line, whereby the cars from a tunnel or drift are guided by the dogs to the rails of the cage.

2. In a safety-cage-chair construction, the combination with a cage, of dogs movably mounted thereon and arranged to support a cage at the various drifts or levels, the said dogs when in the cage-supporting position, lying in the plane of the cage-floor and the bottom of the drift or tunnel, whereby the dogs form guides to facilitate the running of the car from the drift to its position on the cage.

3. In a safety-cage-chair construction, the combination with a cage, of dogs movably mounted thereon and arranged to support a car at the various drifts or levels, the said dogs when in the cage-supporting position, lying in the plane of the cage-floor and the bottom of the drift or tunnel, the free extremities of the dogs being turned outwardly to facilitate the moving of the car from the drift to its position on the cage.

In testimony whereof I affix my signature in presence of two witnesses.

MATTHIAS W. JELINEK.

Witnesses:
 W. P. KNAPP,
 THOMAS BATE.